(No Model.)
A. J. GRINNELL.
SAW SET.
No. 550,503. Patented Nov. 26, 1895.
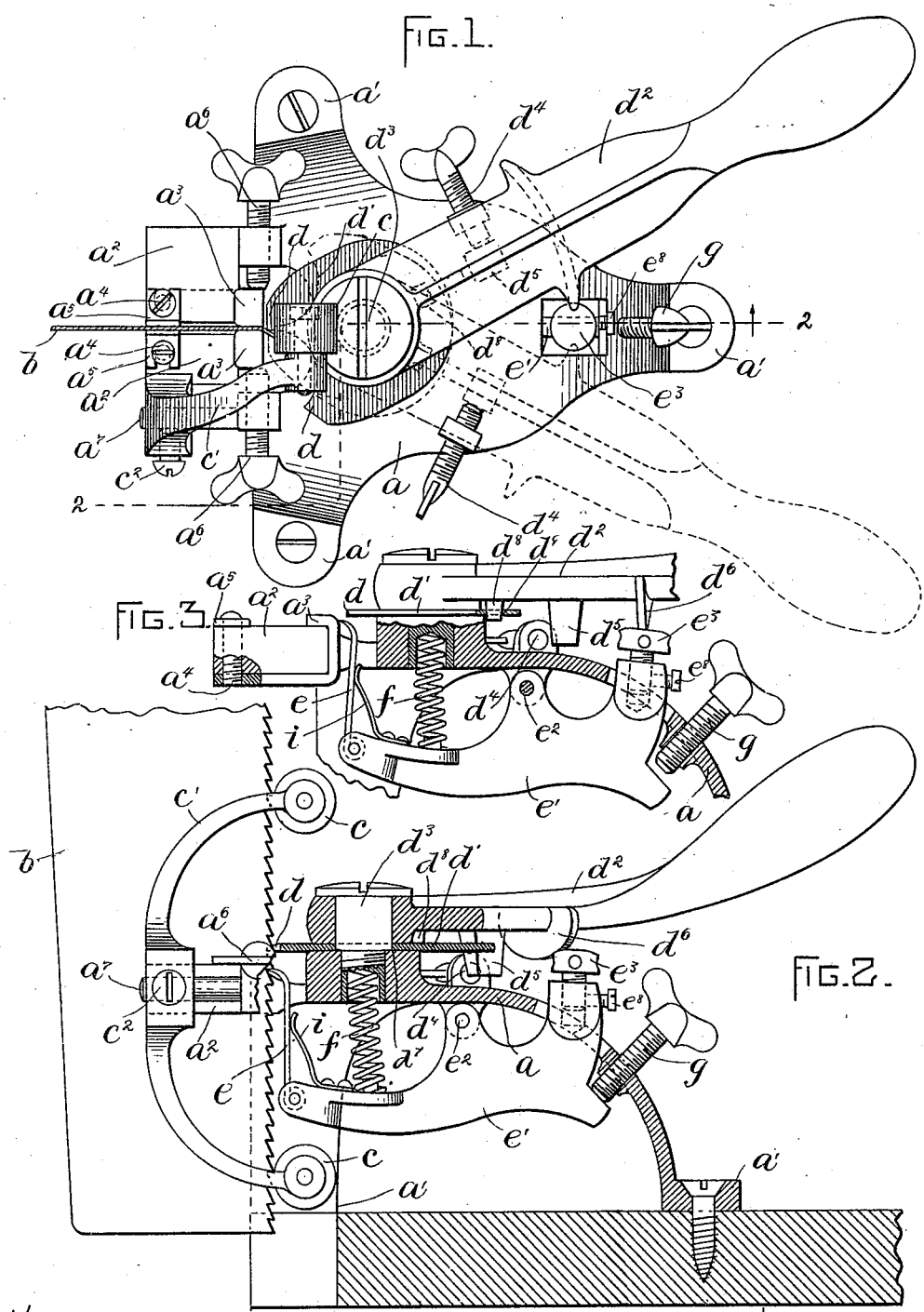
WITNESSES:
H. A. Hall.
Rollin Abell.
INVENTOR:
A. J. Grinnell
by Wright Brown Quinby
Attys.

UNITED STATES PATENT OFFICE.

ADELBERT J. GRINNELL, OF WALTHAM, MASSACHUSETTS, ASSIGNOR OF ONE-HALF TO WILLIAM P. BARTEL, OF SAME PLACE.

SAW-SET.

SPECIFICATION forming part of Letters Patent No. 550,503, dated November 26, 1895.

Application filed March 12, 1895. Serial No. 541,430. (No model.)

*To all whom it may concern:*

Be it known that I, ADELBERT J. GRINNELL, of Waltham, in the county of Middlesex and State of Massachusetts, have invented certain new and useful Improvements in Saw-Sets, of which the following is a specification.

This invention has for its object to provide a simple and efficient device for setting saw-teeth, and one which shall be capable of adjustment to any thickness of saw-blade and any size of tooth, as well as to the different styles of teeth, such as those of cutting-off saws, rip-saws, &c.

The invention consists in the improvements which I will now proceed to describe and claim.

Of the accompanying drawings, forming a part of this specification, Figure 1 represents a plan view of my improved saw-set. Fig. 2 represents a section on line 2 2 of Fig. 1, the feed-dog being shown depressed. Fig. 3 represents a view similar to a portion of Fig. 2, showing the feed-dog raised.

The same letters of reference indicate the same parts in all the figures.

In the drawings, $a$ represents the supporting-frame, which is preferably of the arched form shown, and has feet $a'$, adapted to be secured to a bench or other support.

$a^2$ $a^2$ represent projections on the forward portion of the frame, said projections being separated by a narrow space $a^3$, adapted to receive a saw-blade $b$. Said projections are provided with guides or supports arranged to bear upon the sides of the saw and to support the same laterally against the pressure of the setting-jaws hereinafter described. I prefer to make the said guides adjustable, so that they can co-operate with saws of any desired thickness. I have here shown two pairs of guides $a^3$ $a^3$ and $a^5$ $a^5$, the guides $a^3$ being pivotally connected to the projections $a^2$ by means of screws $a^4$, so that they may swing toward and from the center of the space $a^3$. Adjusting-screws $a^6$ $a^6$ bear upon said guides $a^3$ and hold the same against the sides of the saw. The guides $a^5$ are slotted plates secured to the projections $a^2$ by the screws $a^4$, the slots in said plates permitting their adjustment toward and from the center of the space $a^3$.

$c$ $c$ represent rolls which are arranged to bear upon the edge of the saw at points above and below the side guides above described. Said rolls are journaled upon bearings supported by a holder $c'$, the central portion of which is supported adjustably upon a stud $a^7$, affixed to the supporting-frame and projecting beside one of the projections $a^2$, the central portion of the frame being adapted to slide upon said stud, and being provided with a set-screw $c^2$, by which it may be secured to the stud at any point within the range of its adjustment. One side of the holder $c'$ is formed to bear upon the adjacent edge of the projection $a^2$ to prevent the holder from turning upon the stud $a^7$.

It will be seen that the side guides $a^3$ $a^5$ and the edge guides $c$ enable the saw to be moved in a well-defined path by the feed mechanism hereinafter described.

$d$ $d$ represent setting-jaws, which are arranged at opposite sides of the path of the saw and are arranged to be moved alternately toward the saw, each jaw coming in contact with a tooth of the saw and bending the latter to give it the desired set or angle. Said jaws are preferably formed upon a plate $d'$, which is provided with suitable means for actuating the jaws and causing them to bear alternately against the saw, so that one jaw will set one tooth in one direction while the other jaw will set the next tooth in the opposite direction. The jaws are preferably operated by means of a lever $d^2$, which is pivoted at $d^3$ to the supporting-frame, the arrangement of the lever and jaws being such that when the lever is at one extreme of its movement, as shown in full lines in Fig. 1, one of the jaws will act upon a tooth of the saw, bending the latter in one direction, and when the lever is at the other extreme of its movement, as shown in dotted lines in Fig. 1, the other jaw will act upon the next tooth of the saw, bending said tooth in the opposite direction. The movements of the lever are limited by adjustable stop-screws $d^4$ $d^4$, engaged with the supporting-frame and co-operating with a lug $d^5$ on the under side of the lever $d^2$, the adjustability of said stops enabling the angle or set of the teeth to be regulated and made greater or less, as will be readily seen.

$e$ represents a feed-dog, which is arranged to engage the teeth of the saw and is preferably located immediately below the setting-jaws, as shown in Figs. 2 and 3. Said dog is pivoted to a feed-lever $e'$, which is pivoted at $e^2$ to the supporting-frame and is provided with an adjustable boss or projection $e^3$. (Here shown as a screw projecting upwardly toward the jaw-carrying lever $d^2$.) Said lever has a downwardly-projecting rib $d^6$, which is arranged to bear upon the projection $e^3$ when the lever is moving from one position to the other. The feed-lever $e'$ is controlled by a spring $f$, which presses the projection $e^3$ upwardly and holds it in position for the action of the rib $d^6$. An adjustable stop-screw $g$, engaged with the supporting-frame, limits the movement of the feed-lever by the spring $f$. The feed-dog is pressed toward the saw by means of a spring $i$.

It will be seen from the foregoing that during each movement of the lever $d^2$ the feed-lever $e'$ will be moved by the contact of the rib $d^6$ with the projection of said feed-lever, so that before the forwardly-moving setting-jaw reaches the saw the latter will be moved a space equal to the length of one tooth by the feed-dog, so that a saw-tooth is first fed into position for setting, and is then set by each movement of the lever $d^2$. The length of the feed movement is determined by the adjustable projection $e^3$ and the adjustable stop $g$, so that the saw may be fed a distance corresponding to the length of its teeth.

The adjustability of the edge-guides of the saw enables the jaws to act upon the teeth at any desired distance from the body of the blade.

The die-plate $d'$ is preferably engaged with the lever $d^2$, not only by the bolt $d^3$, which passes through an orifice $d^7$ in said plate, but also by a lug $d^8$, cast or otherwise formed on the lever $d^2$, and entering a hole $d^9$ in the die-plate $d'$ behind the bolt $d^3$, the die-plate being thus rigidly secured, so that it cannot turn or slip accidentally.

The adjustable projection $e^3$ is or may be secured against accidental rotation by a set-screw $e^8$.

I claim—

1. In a saw set, the combination of the supporting frame having at one end adjustable saw-guides or supports arranged to bear on the sides of a saw, a lever pivoted to the frame and provided with a detachable die-plate constituting the shorter arm of the lever, said die-plate having the tooth-bending jaws arranged to act alternately on opposite sides of a saw held by said guides, and edge-guiding rollers adjustable toward and from the pivot of said lever and determining the projection of the saw-teeth into the space between said jaws.

2. In a saw-set, the combination of the supporting frame having at one end adjustable saw-guides or supports arranged to bear on the sides of a saw, a lever pivoted to the frame and provided with a lug or projection such as $d^8$, and a die-plate having an orifice to receive the pivot screw or stud of the lever and another orifice to receive said lug, said die-plate also having setting jaws arranged to act alternately on the opposite sides of a saw held by said guides.

3. In a saw-set, the combination of the supporting frame having at one end adjustable saw-guides or supports arranged to bear on the sides of a saw, a lever pivoted to the frame and provided with a detachable die-plate constituting the shorter arm of the lever, said die-plate having the tooth-bending jaws arranged to act alternately on opposite sides of a saw held by said guides, a holder such as $c'$ movable on the supporting frame toward and from the pivot of the lever, rolls journaled on said holder and arranged to bear on the toothed edge of the saw, and means for securing said holder to the frame in any position to which it may be adjusted.

In testimony whereof I have signed my name to this specification, in the presence of two subscribing witnesses, this 9th day of March, A. D. 1895.

ADELBERT J. GRINNELL.

Witnesses:
WILLIAM P. BARTEL,
C. F. BROWN.